United States Patent
Vitthaladevuni et al.

(10) Patent No.: US 12,101,206 B2
(45) Date of Patent: Sep. 24, 2024

(54) SIGNALING FOR ADDITIONAL TRAINING OF NEURAL NETWORKS FOR MULTIPLE CHANNEL CONDITIONS

(71) Applicant: QUALCOMM Incorporated, San Diego, CA (US)

(72) Inventors: Pavan Kumar Vitthaladevuni, San Diego, CA (US); Taesang Yoo, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 553 days.

(21) Appl. No.: 17/385,659

(22) Filed: Jul. 26, 2021

(65) Prior Publication Data

US 2023/0021835 A1 Jan. 26, 2023

(51) Int. Cl.
*H04L 25/02* (2006.01)
*G06N 3/045* (2023.01)
*G06N 3/08* (2023.01)
*H04B 17/336* (2015.01)

(52) U.S. Cl.
CPC ......... *H04L 25/0254* (2013.01); *G06N 3/045* (2023.01); *G06N 3/08* (2013.01); *H04B 17/336* (2015.01)

(58) Field of Classification Search
None
See application file for complete search history.

(56) References Cited

U.S. PATENT DOCUMENTS

| 5,659,666 | A | * | 8/1997 | Thaler | G06N 3/042 |
| | | | | | 706/30 |
| 6,456,697 | B1 | * | 9/2002 | Chang | G10L 15/20 |
| | | | | | 379/406.01 |
| 10,402,726 | B1 | * | 9/2019 | Moore | G06N 7/01 |
| 2005/0084039 | A1 | * | 4/2005 | Kocic | H04L 25/062 |
| | | | | | 375/319 |
| 2005/0213678 | A1 | * | 9/2005 | Lewis | H04L 27/266 |
| | | | | | 375/260 |

(Continued)

OTHER PUBLICATIONS

International Search Report and Written Opinion—PCT/US2022/034572—ISA/EPO—Oct. 4, 2022.

*Primary Examiner* — Christopher T Wyllie

(74) *Attorney, Agent, or Firm* — QUALCOMM Incorporated

(57) ABSTRACT

A method of wireless communication by a user equipment (UE) includes receiving, from a base station, a configuration to train a neural network for multiple different signal to noise ratios (SNRs) of a channel estimate for a wireless communication channel. The method also includes determining a current SNR of the channel estimate is above a first threshold value. The method further includes training the neural network based on the channel estimate, to obtain a first trained neural network. The method still further includes perturbing the channel estimate to obtain a perturbed channel estimate, and training the neural network based on the perturbed channel estimate, to obtain a second trained neural network. The method includes reporting, to the base station, parameters of the first trained neural network along with the channel estimate, and parameters of the second trained neural network.

26 Claims, 9 Drawing Sheets

(56) References Cited

U.S. PATENT DOCUMENTS

| | | | |
|---|---|---|---|
| 2016/0150361 A1* | 5/2016 | Zhu | H04W 4/029 455/456.1 |
| 2016/0162781 A1* | 6/2016 | Lillicrap | G06N 3/082 706/25 |
| 2019/0277957 A1* | 9/2019 | Chandrasekhar | G01S 5/017 |
| 2019/0288878 A1* | 9/2019 | Shen | H04L 25/0224 |
| 2020/0107268 A1* | 4/2020 | Lee | H04W 52/0229 |
| 2020/0117863 A1* | 4/2020 | Ha | G06K 19/07771 |
| 2020/0312336 A1* | 10/2020 | Kang | G06N 3/045 |
| 2021/0021297 A1* | 1/2021 | Smyth | G01S 5/0257 |
| 2021/0075691 A1* | 3/2021 | Zeng | H04L 1/203 |
| 2021/0084601 A1* | 3/2021 | Rofougaran | G06N 3/045 |
| 2021/0091881 A1* | 3/2021 | Gutman | H04L 1/0025 |
| 2021/0185515 A1 | 6/2021 | Bao et al. | |
| 2021/0241175 A1* | 8/2021 | Harang | G06F 18/22 |
| 2021/0266950 A1* | 8/2021 | Namgoong | H04L 5/0048 |
| 2021/0273707 A1* | 9/2021 | Yoo | H04L 1/0041 |
| 2021/0331677 A1* | 10/2021 | Kim | B60W 40/10 |
| 2021/0351885 A1* | 11/2021 | Chavva | G06N 3/08 |
| 2021/0383207 A1* | 12/2021 | Beery | G06N 3/047 |
| 2021/0399924 A1* | 12/2021 | Amjad | H04L 25/03006 |
| 2022/0060917 A1* | 2/2022 | Vitthaladevuni | G06N 3/045 |
| 2022/0131625 A1* | 4/2022 | Garcia | H04L 5/001 |
| 2022/0217021 A1* | 7/2022 | Pezeshki | H04W 72/21 |
| 2022/0237465 A1* | 7/2022 | Lewis | G06N 3/082 |
| 2022/0277631 A1* | 9/2022 | Sciancalepore | G08B 13/2491 |
| 2022/0376956 A1* | 11/2022 | Wesemann | H04L 25/0204 |
| 2023/0021835 A1* | 1/2023 | Vitthaladevuni | G06N 3/08 |
| 2023/0084164 A1* | 3/2023 | Chen | H04B 7/0626 375/267 |
| 2023/0100253 A1* | 3/2023 | Zhu | H04W 24/02 706/26 |
| 2023/0109063 A1* | 4/2023 | Wang | H04B 7/0626 370/252 |
| 2023/0209390 A1* | 6/2023 | Zeng | H04W 24/02 |
| 2023/0359886 A1* | 11/2023 | Vitthaladevuni | H04L 41/16 |

\* cited by examiner

SIGNALING FOR ADDITIONAL TRAINING OF NEURAL NETWORKS FOR MULTIPLE CHANNEL CONDITIONS

FIELD OF THE DISCLOSURE

The present disclosure relates generally to wireless communications, and more specifically to signaling for training neural networks for different types of channel conditions.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the base station to the UE, and the uplink (or reverse link) refers to the communications link from the UE to the base station. As will be described in more detail, a base station may be referred to as a Node B, an evolved Node B (eNB), a gNB, an access point (AP), a radio head, a transmit and receive point (TRP), a new radio (NR) base station, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

SUMMARY

In aspects of the present disclosure, a method of wireless communication by a user equipment (UE) includes receiving, from a base station, a configuration to train a neural network for multiple different signal to noise ratios (SNRs) of a channel estimate for a wireless communication channel. The method also includes determining a current signal to noise ratio (SNR) of the channel estimate is above a first threshold value, and training the neural network based on the channel estimate, to obtain a first trained neural network. The method further includes perturbing the channel estimate to obtain a perturbed channel estimate, and training the neural network based on the perturbed channel estimate, to obtain a second trained neural network. The method still further includes reporting, to the base station, parameters of the first trained neural network along with the channel estimate, and parameters of the second trained neural network.

In other aspects of the present disclosure, a method of wireless communication by a base station includes transmitting, to a user equipment (UE), a configuration to train a neural network for multiple different signal to noise ratios (SNRs) of a channel estimate for a wireless communication channel. The method also includes receiving, from the UE, parameters of a first trained neural network along with the channel estimate, and parameters of a second trained neural network.

Other aspects of the present disclosure are directed to an apparatus for wireless communication by a user equipment (UE) having a memory and one or more processor(s) coupled to the memory. The processor(s) is configured to receive, from a base station, a configuration to train a neural network for multiple different signal to noise ratios (SNRs) of a channel estimate for a wireless communication channel. The processor(s) is also configured determine a current signal to noise ratio (SNR) of the channel estimate is above a first threshold value, and to train the neural network based on the channel estimate, to obtain a first trained neural network. The processor(s) is further configured to perturb the channel estimate to obtain a perturbed channel estimate, and to train the neural network based on the perturbed channel estimate, to obtain a second trained neural network. The processor(s) is still further configured to report, to the base station, parameters of the first trained neural network along with the channel estimate, and parameters of the second trained neural network.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
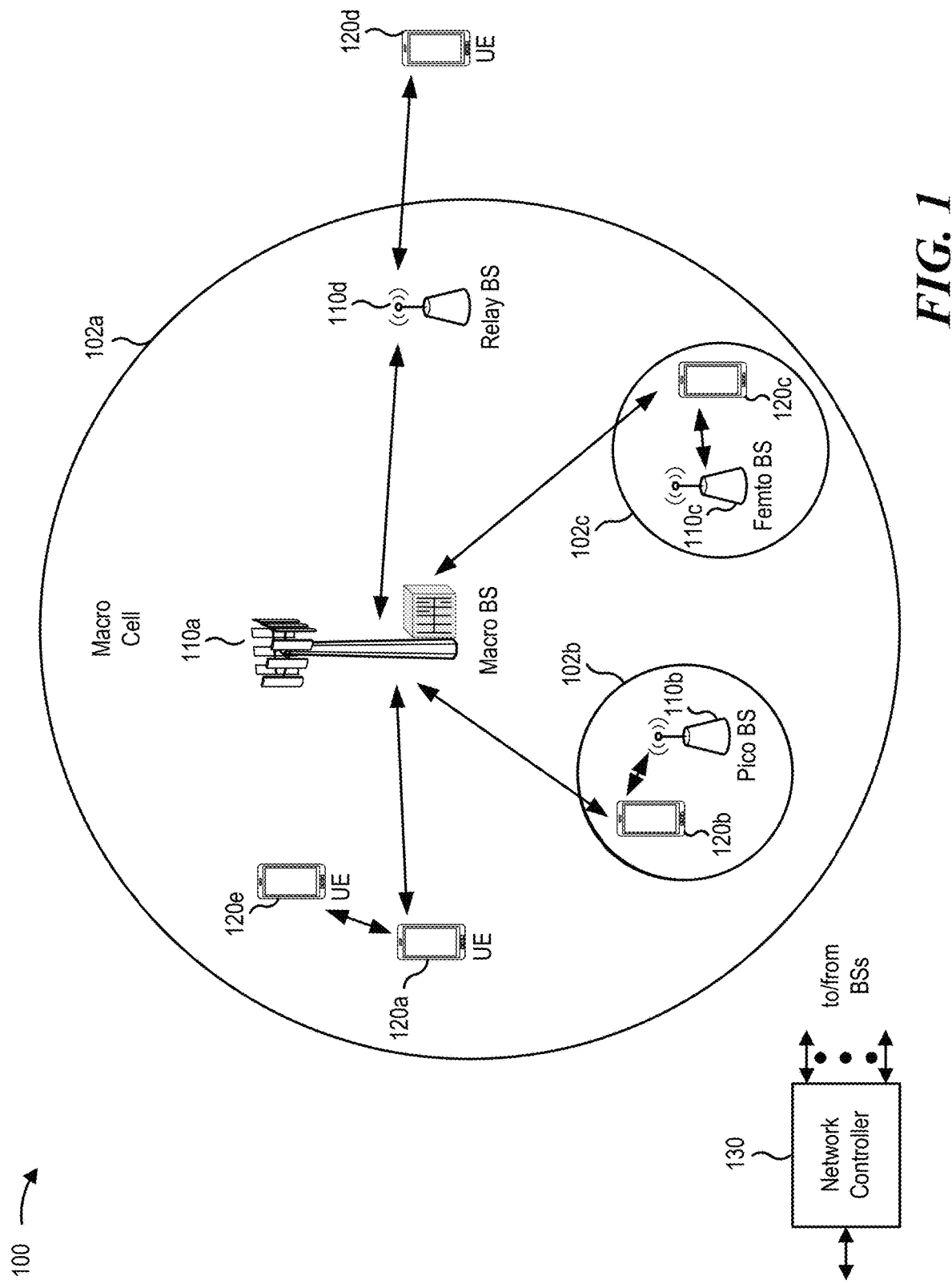
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

User equipments (UEs) may experience differing channel conditions within a cell. Cell center UEs see a significantly higher channel estimation signal to noise ratio (SNR) than UEs at the cell edge, for instance. UEs may use neural networks to compress data prior to sending the data across a wireless channel. UEs entering a cell may download weights for a channel compression neural network model from a base station (BS or gNB), to start off their training of the neural network model. For cell edge UEs, because of the amount of noise in the channel estimate, it is not advisable to train the channel compression neural network using noisy channel estimates. At low signal to noise ratios (SNRs), channel estimation noise may change a distribution of the input to the neural network (NN). Moreover, at low SNR, the channel may appear to have greater rank than what actually exists. If the SNR drops too low, the neural network should be retrained. A single neural network may not work well for multiple channel estimation SNRs. For example, a network trained with a high channel estimation SNR may not work well for a UE experiencing a low SNR, or vice-versa.

According to aspects of the present disclosure, a neural network provided by a base station will be used by a UE until the channel estimate SNR improves beyond a threshold. In addition, the base station may customize the neural network weights to the channel estimation SNR that the UE experiences. The special neural network weights may be provided to the base station by UEs experiencing good channel conditions, by perturbing their channel estimates appropriately.

According to aspects of the present disclosure, a base station may detect UEs that are located in very good path loss locations, using, for example, power control logic. These UEs may be configured to train multiple neural networks (NNs), while emulating multiple channel estimation SNRs. These UEs may have enough memory and processing power to train multiple neural networks. The UEs may signal these capabilities to the base station. In order to obtain different SNRs, the UEs may perturb the channel estimate and train the neural networks. The UEs then feedback each such neural network (or the neural network weights) to the base station.

For cell edge UEs, the base station may configure them to not train the neural networks. In this case, the cell edge UEs use the neural network received from the base station without any training. When a cell edge UE moves into an environment with a better signal, if an estimate of channel estimation signal to noise ratio (SNR) increases above a configurable threshold value, the base station may configure the UE to train the neural network for use by the UE. When the UE moves into an environment with an even stronger signal, for example above another configurable threshold value, the base station may configure the UE to train the neural network for multiple different SNRs. In this case, the UE may perturb the channel estimate to train the neural network at different SNRs. Similarly, when a UE moves from an environment with a very strong signal to an environment with a weaker signal, the base station may configure the UE to only train the neural network for the UE's use, instead of training multiple neural networks with different SNRs. If the conditions further deteriorate, the base station may configure the UE to use the model without any training. Aspects of the present disclosure enable recovery of some loss from channel estimation by retraining the neural network and providing SNR appropriate neural network models.

FIG. 1 is a diagram illustrating a network 100 in which aspects of the present disclosure may be practiced. The network 100 may be a 5G or NR network or some other wireless network, such as an LTE network. The wireless network 100 may include a number of base stations 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB)).

As indicated above, FIG. 1 is provided merely as an example. Other examples may differ from what is described with regard to FIG. 1.

Figure 2:
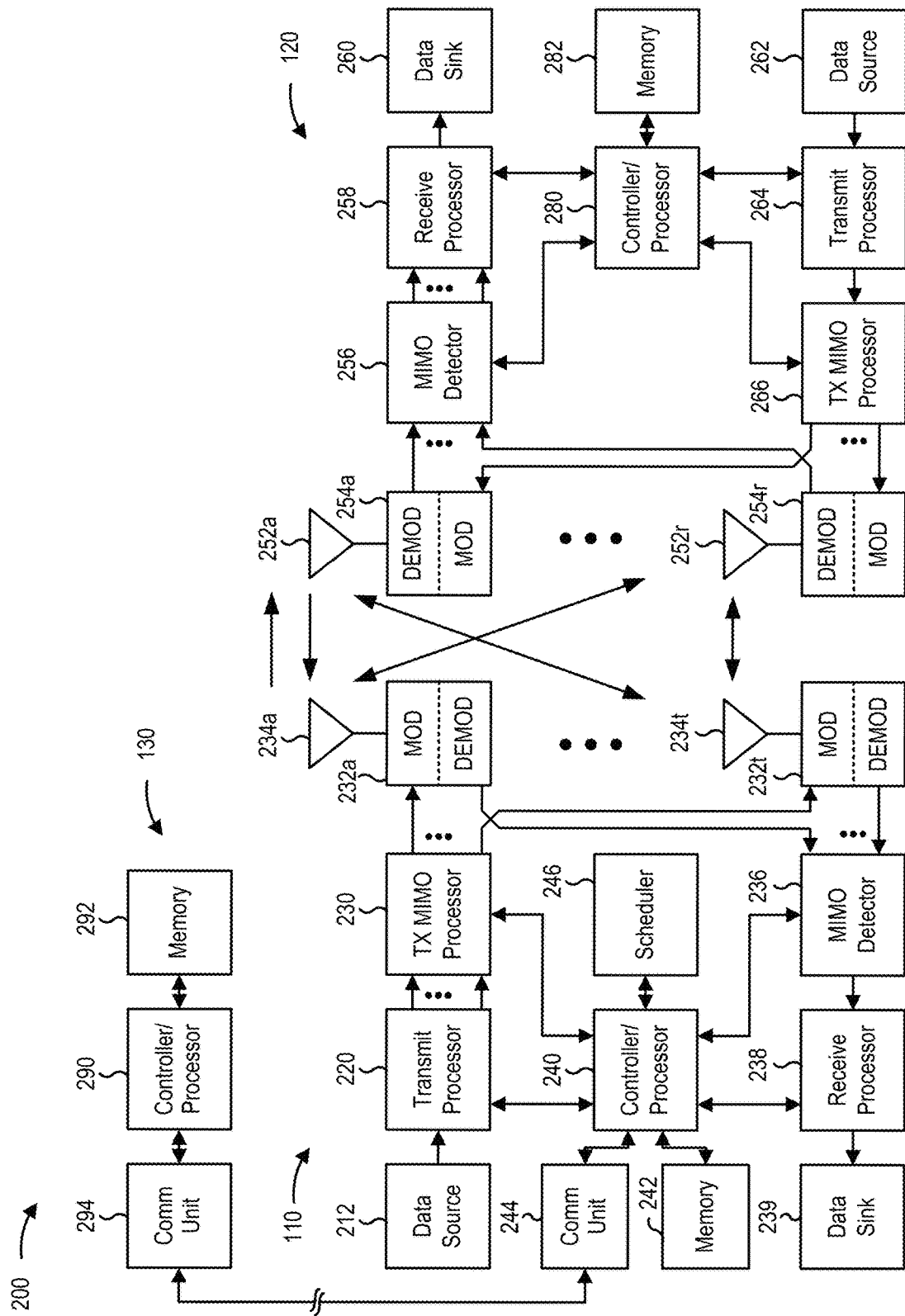
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with signaling for training neural networks for different types of channel conditions, as described in more detail elsewhere. For example, the controller/processor 240 of the base station 110, the controller/processor 280 of the UE 120, and/or any other component(s) of FIG. 2 may perform or direct operations of, for example, the processes of FIGS. 7 and 8 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for determining, means for training, means for perturbing, means for reporting, means for computing, means for receiving, means for indicating, and/or means for transmitting. In some aspects, the base station 110 may include means for receiving, and/or means for transmitting. Such means may include one or more components of the UE 120 or base station 110 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
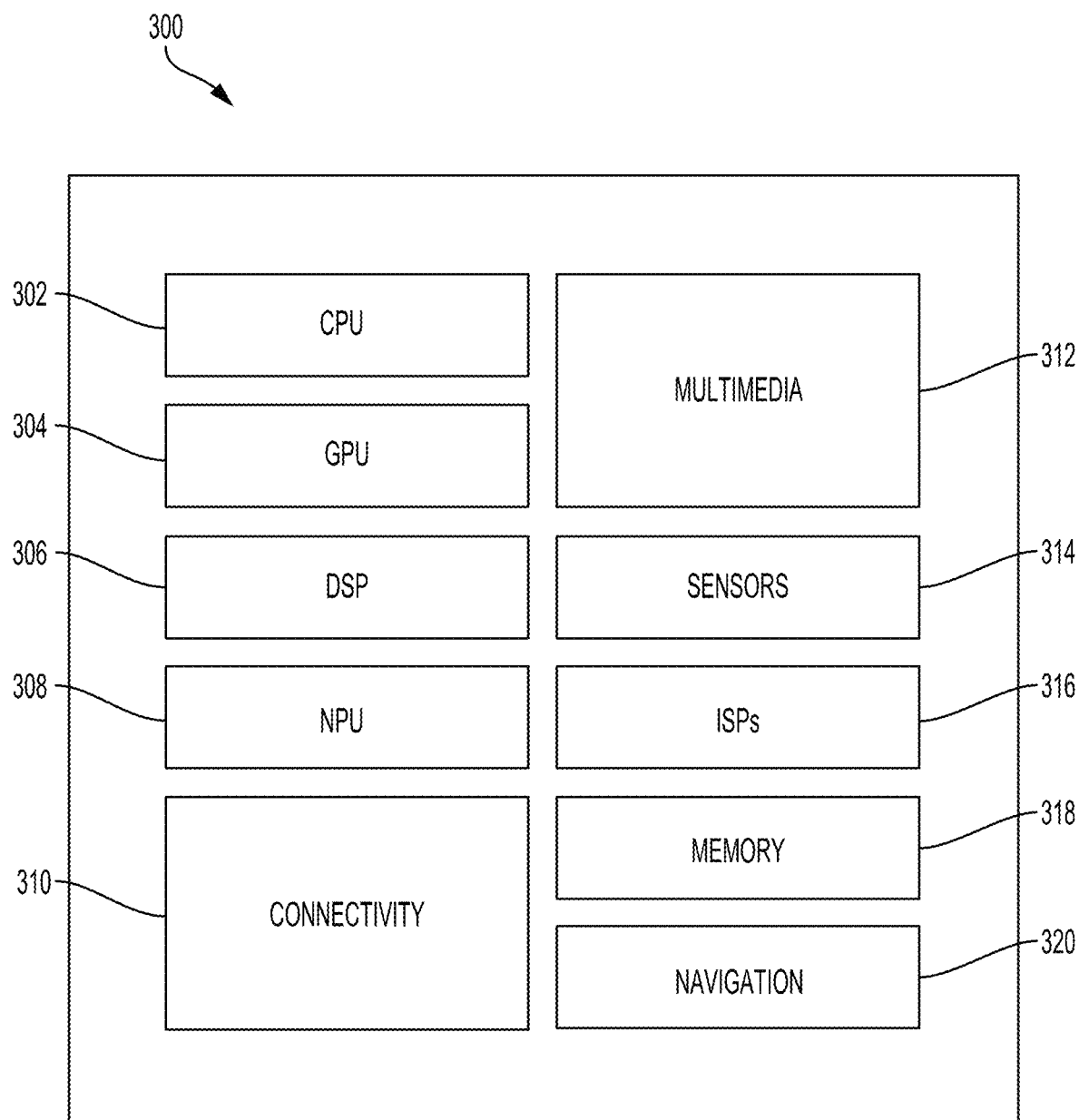
FIG. 3 illustrates an example implementation of designing a neural network using a system-on-a-chip (SOC), including a general-purpose processor, in accordance with certain aspects of the present disclosure.

FIG. 3 illustrates an example implementation of a system-on-a-chip (SOC) 300, which may include a central processing unit (CPU) 302 or a multi-core CPU configured for generating gradients for neural network training, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In aspects of the present disclosure, the instructions loaded into the general-purpose processor 302 may comprise code to receive, from a base station, a configuration to train a neural network for multiple different signal to noise ratios (SNRs) of a channel estimate for a wireless communication channel. The processor 302 is also configured determine a current signal to noise ratio (SNR) of the channel estimate is above a first threshold value, and to train the neural network based on the channel estimate, to obtain a first trained neural network. The processor 302 is further configured to perturb the channel estimate to obtain a perturbed channel estimate, and to train the neural network based on the perturbed channel estimate, to obtain a second trained neural network. The processor 302 is still further configured to report, to the base station, parameters of the first trained neural network along with the channel estimate, and parameters of the second trained neural network. The general-purpose processor 302 may be configured to transmit, to a user equipment (UE), a configuration to train a neural network for multiple different signal to noise ratios (SNRs) of a channel estimate for a wireless communication channel. The processor 302 may further be configured to receive, from the UE, parameters of a first trained neural network along with the channel estimate, and parameters of a second trained neural network.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
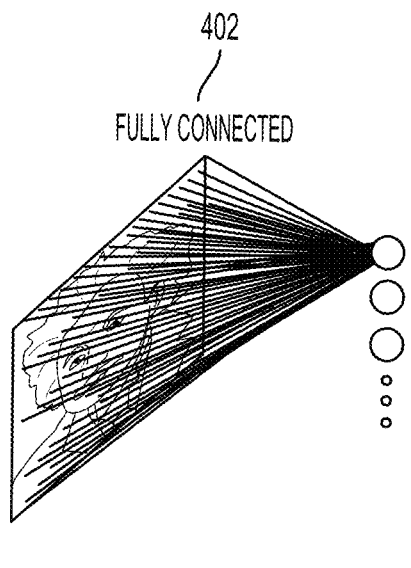
FIGS. 4A, 4B, and 4C are diagrams illustrating a neural network, in accordance with aspects of the present disclosure.
Figure 4B:
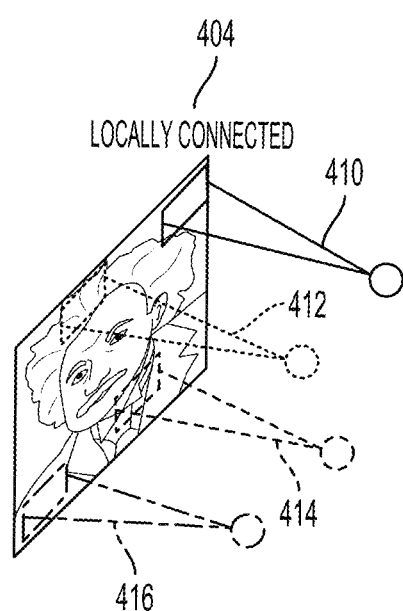

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
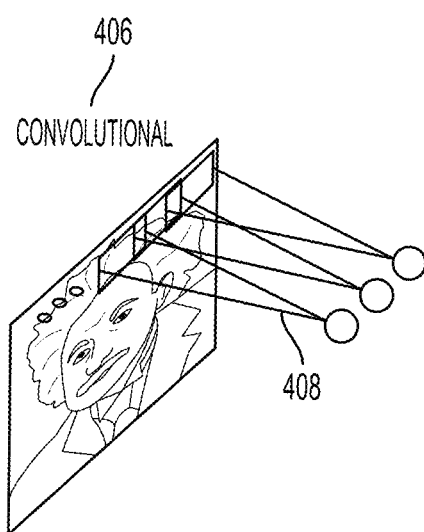

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
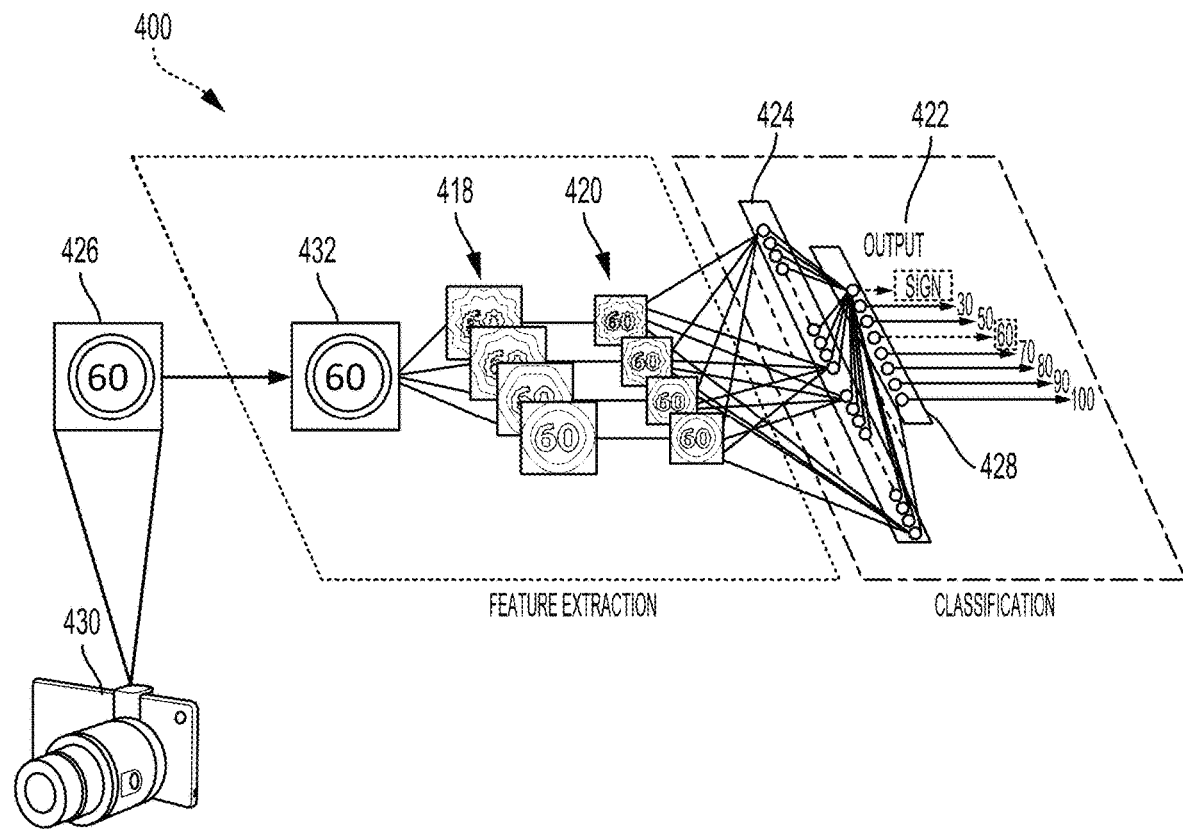
FIG. 4D is a diagram illustrating an exemplary deep convolutional network (DCN), in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
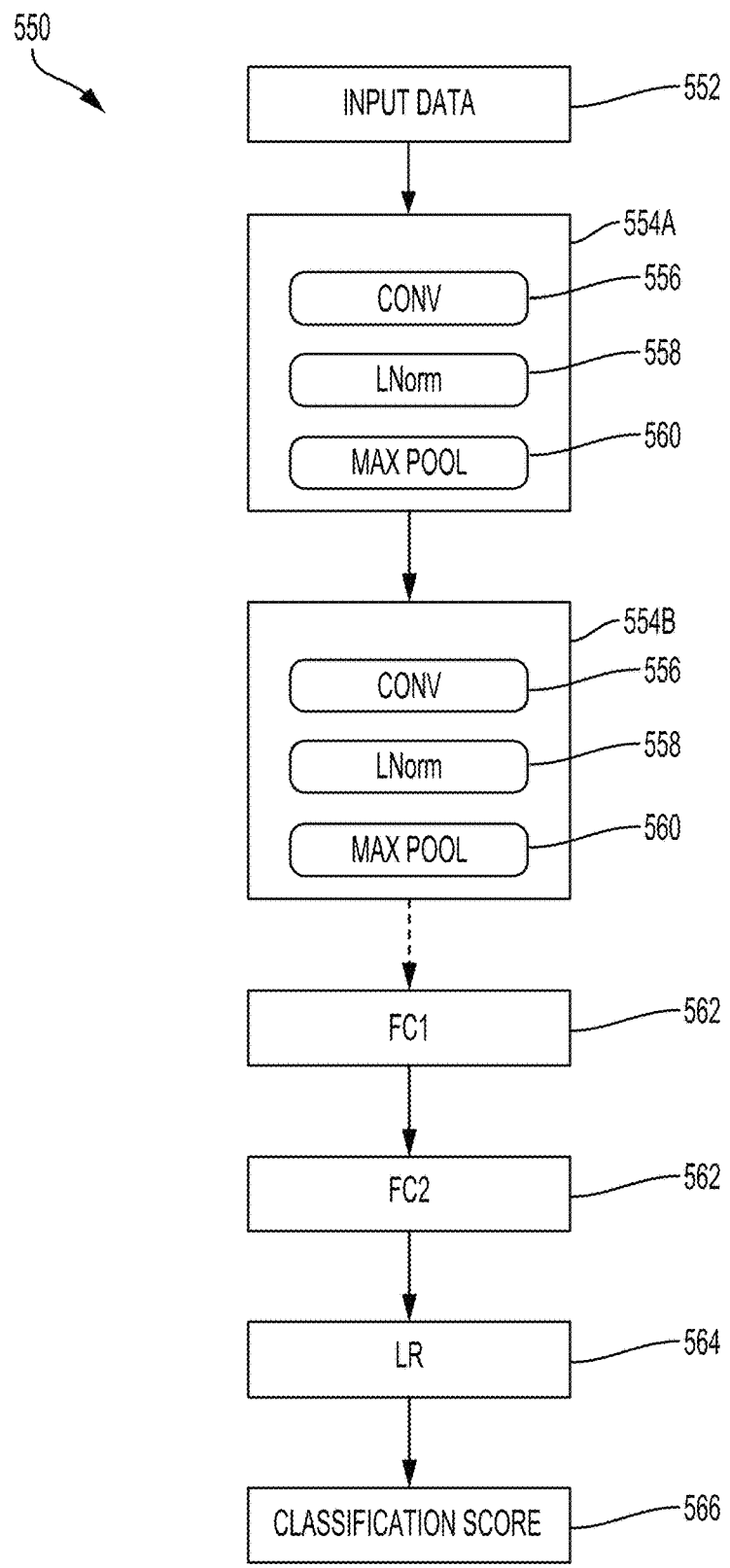
FIG. 5 is a block diagram illustrating an exemplary deep convolutional network (DCN), in accordance with aspects of the present disclosure.

FIG. 5 is a block diagram illustrating a deep convolutional network 550. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 556, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

As indicated above, FIGS. 3-5 are provided as examples. Other examples may differ from what is described with respect to FIGS. 3-5.

User equipments (UEs) may experience differing channel conditions within a cell. Cell center UEs see a significantly higher channel estimation signal to noise ratio (SNR) than UEs at the cell edge, for instance. UEs may use neural networks to compress data prior to sending across a wireless channel, and to decompress the data after receipt. UEs entering a cell may download weights for a channel compression neural network model from a base station (BS or gNB), to start off their training of the neural network model. For cell edge UEs, because of the amount of noise in the channel estimate, it is not advisable to train the channel compression neural network using noisy channel estimates. According to aspects of the present disclosure, the neural network provided by the base station will be used until the channel estimate SNR improves beyond a threshold. In addition, the base station may customize the neural network weights to the channel estimation SNR that the UE experiences. The special neural network weights may be provided to the base station by UEs experiencing good channel conditions, by perturbing their channel estimates appropriately.

According to aspects of the present disclosure, a base station may detect UEs that are located in very good path loss locations, using, for example, power control logic. These UEs may be configured to train multiple neural networks (NNs), while emulating multiple channel estimation SNRs. These UEs may have enough memory and processing power to train multiple neural networks. The UEs may signal these capabilities to the base station. In order to obtain different SNRs, the UEs may perturb the channel estimate and train the neural networks. The UEs then feedback each such neural network (or the neural network weights) to the base station.

For cell edge UEs, the base station configures them to not train the neural networks. In this case, the cell edge UEs use the neural network received from the base station without any training. When a cell edge UE moves into an environment with a better signal, if an estimate of channel estimation signal to noise ratio (SNR) increases above a configurable threshold value, the base station may configure the UE to train the neural network for use by the UE. When the UE moves into an environment with an even stronger signal, for example above another configurable threshold value, the base station may configure the UE to train the neural network for multiple different SNRs. In this case, the UE may perturb the channel estimate to train the neural network at different SNRs. Similarly, when a UE moves from an environment with a very strong signal to an environment with a weaker signal, the base station may configure the UE to only train the neural network for the UE's use, instead of training multiple neural networks with different SNRs. If the conditions further deteriorate, the base station may configure the UE to use the model without any training.

At low signal to noise ratios (SNRs), channel estimation noise may change a distribution of the input to the neural network (NN). It has been shown that rank per user equipment (UE) increases under the influence of channel estimation error. Moreover, at low SNR, the channel may appear whiter than it actually is. If the SNR drops too low, the neural network should be retrained. However, a single neural network may not work well for multiple channel estimation SNRs. For example, a network trained with a high channel estimation SNR may not work well for a UE experiencing a low SNR. It should also be considered as to whether a high payload is specified for transmission of compressed channel at low SNRs. That is, if the SNR is too low, the base station may ask the UE to compress the channel to a lower payload size than if the UE is experiencing a good pathloss.

According to aspects of the present disclosure, a neural network is trained on an ideal channel. To address the issues resulting from low channel estimation SNRs, the performance using a neural network trained at high SNR, on low channel estimation realizations, may be quantified. An input vector may be represented as x_ideal, which may be normalized to unit power. A noisy input vector may be represented as x, which equals x_ideal plus noise, n. The noisy input vector x may also be referred to as a sum vector and may be normalized to unit power. A reconstructed channel output is defined as y, which is a function of x, in other words, y=f(x). An ideal channel estimate (ch-est) is represented as y_ideal and is equal to f(x_ideal).

A first mean square error (MSE1) may have a value equal to MSE(y, x). This value indicates how a probability density function (PDF) of the noisy input vector, x, deviates from the reconstructed channel "y". A second mean square error (MSE2) may have a value equal to MSE(y, x_ideal). This value is of particular interest, as it measures the deviation of the reconstructed channel from the ideal input vector. In an ideal no-noise situation, an ideal mean square error (MSE ideal) value, e.g., MSE(y_ideal, x_ideal) would be the same as MSE2 and MSE1.

At high signal to noise ratios (SNRs), the ideal channel estimate (x_ideal) is similar to the noisy channel "x", and the first mean square error (MSE1) is similar to both the second mean square error (MSE2) and the ideal mean square error (MSE ideal). At low SNR, the noisy-estimate of the channel, "x", is very different from the ideal channel estimate (x_ideal). As such, the ideal MSE (MSE ideal) is less than both MSE2 and MSE1.

If an SNR becomes too low, retraining of the neural network may be beneficial. According to aspects of the present disclosure, a neural network may be retrained by computing a loss metric between an output of the neural network and an ideal or noiseless input. The loss metric may be incorporated during back propagation.

Figure 6:
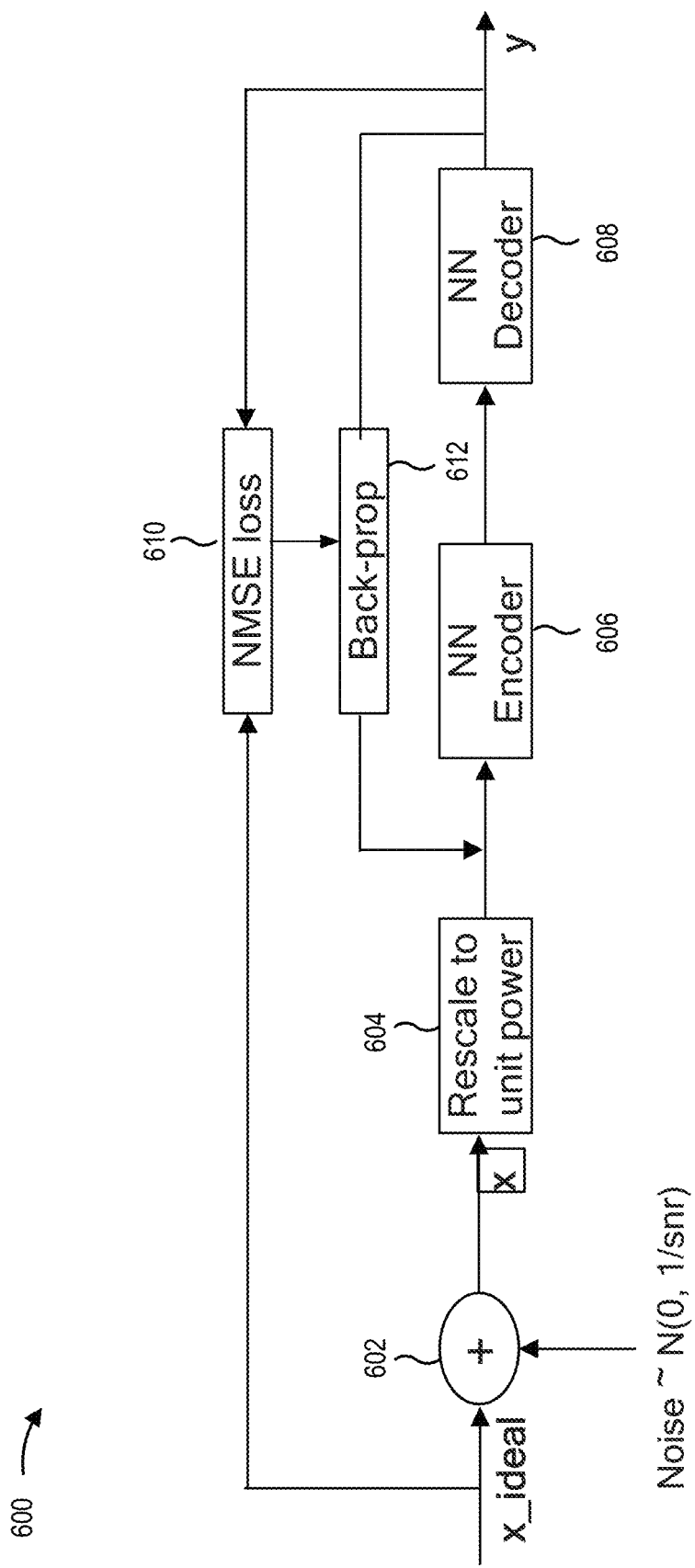
FIG. 6 is a block diagram illustrating an example model for retraining a neural network with multiple signal to noise ratios (SNRs) of a channel estimate, in accordance with various aspects of the present disclosure.

FIG. 6 is a block diagram illustrating an example model 600 for retraining a neural network with multiple signal to noise ratios (SNRs) of a channel estimate, in accordance with various aspects of the present disclosure. The retraining incorporates a loss metric. As seen in FIG. 6, an adder 602 receives as input an ideal channel estimate (x_ideal) and also receives noise. In the example of FIG. 6, the noise (N(0, 1/SNR)) has a Gaussian distribution with a mean of zero and a variance of 1/SNR. The adder 602 adds the noise to the ideal channel estimate to obtain a noisy input vector x. Block 604 rescales the noisy input vector, x, to unit power. A neural network encoder 606 receives the sum vector normalized to unit power, performs an operation on the received data, and transmits the processed data to a neural network decoder 608. The neural network decoder 608 processes the received data to obtain and output a reconstructed channel, y.

In some configurations, the neural network encoder 606 operates within a transmitting device to perform compression of data for transmitting across a wireless channel to the neural network decoder 608, which operates within a receiver. The neural network decoder 608 performs the decompression. The neural network encoder 606 and decoder 608 are, however, not limited to performing compression and decompression. Other functions are also contemplated.

The neural network (including the neural network encoder 606 and neural network decoder 608) may be retrained using back propagation techniques, as seen at block 612. According to aspects of the present disclosure, the backpropagation may incorporate a normalized mean square error (NMSE) computed between the reconstructed channel, y, and the ideal channel estimate, x_ideal, as seen at block 610. By retraining the network with the NMSE, some amount of loss from channel estimates is recovered, especially at low signal to noise ratios (SNRs). For example, with an encoder compressing output into thirty-two dimensions in an environment with very low SNR (e.g., −5 dB), the loss may be recovered to within 1 dB of a channel estimate obtained during ideal conditions.

Aspects of the present disclosure enable recovery of some loss from channel estimation by retraining the neural network (NN). A base station may configure high geometry UEs (e.g., UEs close to a base station) to train the neural network (NN) for multiple configurable channel estimation signal to noise ratios (SNRs). These UEs may then feedback the calculated weights to the base station. Higher layer signaling, downlink control (DCI) messages, or physical downlink shared channel (PDSCH) signaling may be used for the configuring. The UEs may transmit the feedback through upper layer signaling, uplink DCI messages, or physical uplink shared channel (PUSCH) signaling. The base station may then transmit the weights to cell edge UEs using higher layer signaling, DCI messages, or PDSCH signaling.

The base station may configure cell edge UEs to not train the neural networks unless the estimate of channel estimation signal to noise ratio (SNR) increases beyond a configured threshold. The threshold configuration may be set by the network using higher layer signaling, DCI messages, or PDSCH signaling.

Figure 7:
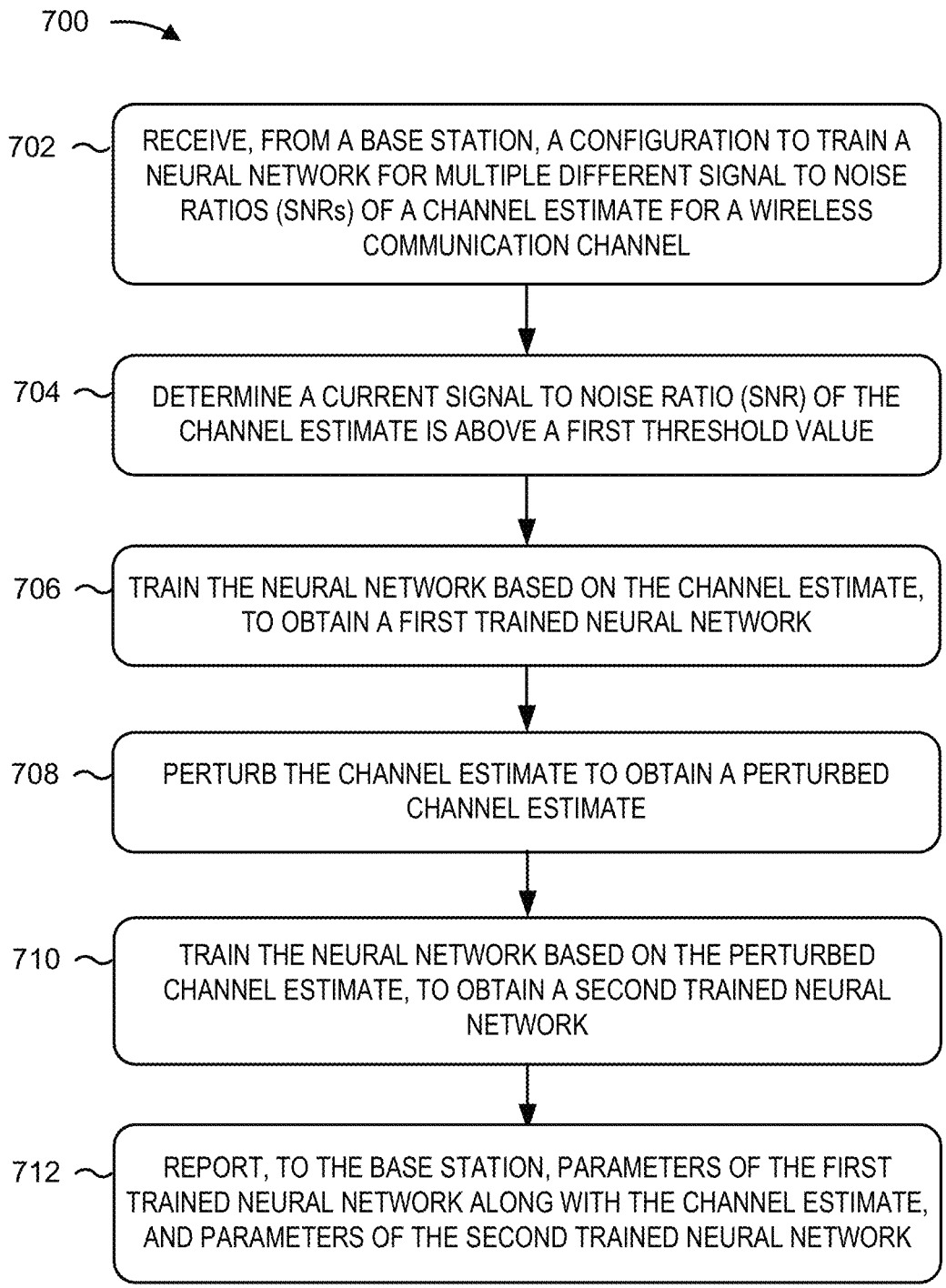
FIG. 7 is a flow diagram illustrating an example process performed, for example, by a user equipment, in accordance with various aspects of the present disclosure.

FIG. 7 is a flow diagram illustrating an example process 700 performed, for example, by a UE, in accordance with various aspects of the present disclosure. The example process 700 is an example of signaling for training neural networks for different types of channel conditions. The operations of the process 700 may be implemented by a UE 120.

At block 702, the user equipment (UE) receives, from a base station, a configuration to train a neural network for multiple different signal to noise ratios (SNRs) of a channel estimate for a wireless communication channel. For example, the UE (e.g., using the antenna 252, demodulator (DEMOD) 254, MIMO detector 256, receive processor 258, controller/processor 280, and/or memory 282) may receive the configuration. The neural network may be for channel compression. The UE may receiving the configuration to train the neural network via higher layer signaling, a downlink control information (DCI) message, or physical downlink shared channel (PDSCH) signaling. The receiving may occurring in response to a current SNR exceeding a first threshold value At block 704, the user equipment (UE) determines a current signal to noise ratio (SNR) of the channel estimate is above a first threshold value. For example, the UE (e.g., using the controller/processor 280, and/or memory 282) may determine the signal. The UE may receive, from the base station, a configuration of the first threshold value via higher layer signaling, a downlink control information (DCI) message, or physical downlink shared channel (PDSCH) signaling. The UE may indicate, to the base station, that the current SNR exceeds the first threshold value At block 706, the user equipment (UE) trains the neural network based on the channel estimate, to obtain a first trained neural network. For example, the UE (e.g., using the controller/processor 280, and/or memory 282) may train the neural network. The UE may receive an instruction to train the neural network based only on a current channel estimate and then use the neural network trained based on only the current channel estimate. The instruction may be received via higher layer signaling, a downlink control information (DCI) message, or physical downlink shared channel (PDSCH) signaling, in response to the current SNR having a value between the first threshold value and a second threshold value.

At block 708, the user equipment (UE) perturbs the channel estimate to obtain a perturbed channel estimate. For example, the UE (e.g., using the controller/processor 280, and/or memory 282) may perturb the channel estimate. At block 710, the user equipment (UE) trains the neural network based on the perturbed channel estimate, to obtain a second trained neural network. For example, the UE (e.g., using the controller/processor 280, and/or memory 282) may train the neural network.

At block 712, the user equipment (UE) reports, to the base station, parameters of the first trained neural network along with the channel estimate, and parameters of the second trained neural network. For example, the UE (e.g., using the antenna 252, modulator (MOD) 254, transmit MIMO processor 266, transmit processor 264, controller/processor 280, memory 282, and/or the like) may report the parameters. The UE may also transmit, to the base station, UE capability information for training the neural network for the plurality of different SNRs, the UE capability information indicating an amount of available UE memory and an amount of available UE processing power.

Figure 8:
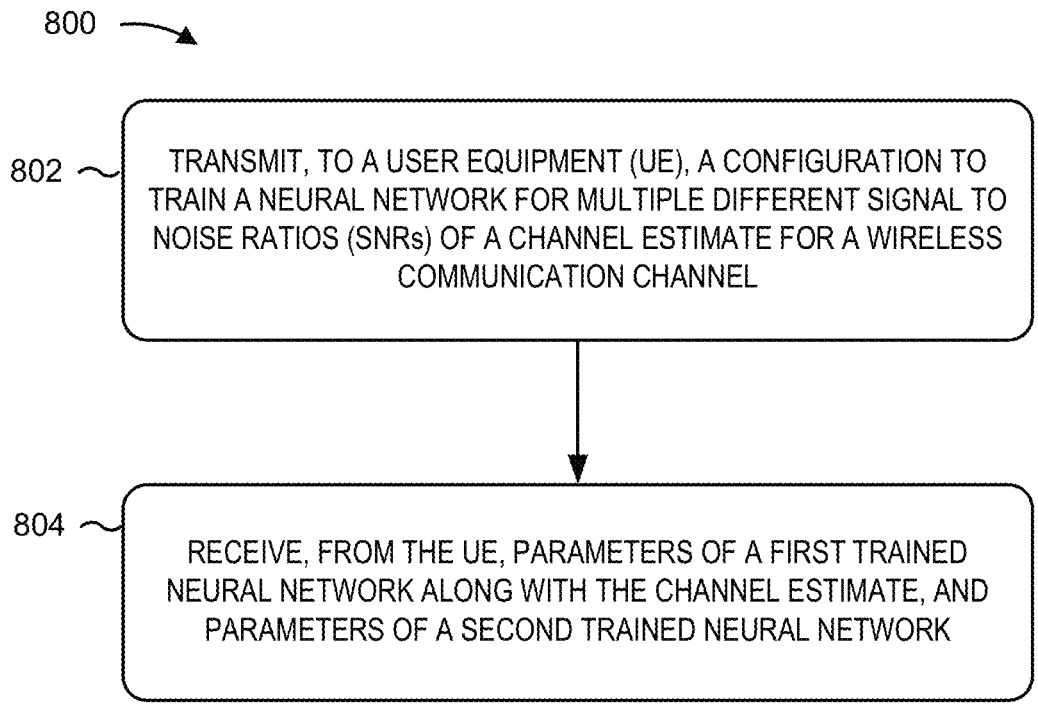
FIG. 8 is a flow diagram illustrating an example process performed, for example, by a base station, in accordance with various aspects of the present disclosure.

FIG. 8 is a flow diagram illustrating an example process 800 performed, for example, by a base station, in accordance with various aspects of the present disclosure. The example process 800 is an example of signaling for training neural networks for different types of channel conditions. The operations of the process 800 may be implemented by a base station 110.

At block 802, the base station transmits, to a user equipment (UE), a configuration to train a neural network for multiple different signal to noise ratios (SNRs) of a channel estimate for a wireless communication channel. For example, the base station (e.g., using the antenna 234, modulator (MOD) 232, TX MIMO processor 230, transmit processor 220, controller/processor 240, and/or memory 242) may transmit the configuration. The base station may transmit a first threshold value, above which the UE trains the neural network for the different SNRs. The first threshold value may be transmitted via higher layer signaling, a downlink control information (DCI) message, or physical downlink shared channel (PDSCH) signaling. The base station may also transmit an instruction to stop training the neural network, in response to a current SNR of the UE falling below a second threshold value that is lower than the first threshold value. The base station may transmit an instruction to train the neural network based only on a current channel estimate and then use the neural network trained based on only the current channel estimate, in response to a current SNR having a value between the first threshold value and a second threshold value.

At block 804, the base station receives, from the UE, parameters of a first trained neural network along with the channel estimate, and parameters of a second trained neural network. For example, the base station (e.g., using the antenna 234, demodulator (DEMOD) 232, MIMO detector 236, receive processor 238, controller/processor 240, and/or memory 242) may receive the parameters. The base station may receive, from the UE, UE capability information for training the neural network for the different SNRs. The UE capability information indicates an amount of available UE memory and an amount of available UE processing power.

Implementation examples are described in the following numbered clauses.

1. A method of wireless communication by a user equipment (UE), comprising:
   receiving, from a base station, a configuration to train a neural network for a plurality of different signal to noise ratios (SNRs) of a channel estimate for a wireless communication channel;
   determining a current signal to noise ratio (SNR) of the channel estimate is above a first threshold value;
   training the neural network based on the channel estimate, to obtain a first trained neural network;
   perturbing the channel estimate to obtain a perturbed channel estimate;
   training the neural network based on the perturbed channel estimate, to obtain a second trained neural network; and
   reporting, to the base station, parameters of the first trained neural network along with the channel estimate, and parameters of the second trained neural network.

2. The method of clause 1, in which the training occurs in response to the current SNR of the channel estimate exceeding the first threshold value.

3. The method of clause 1 or 2, further comprising:
   computing a loss metric between a reconstructed channel estimate and the channel estimate having the current SNR above the first threshold value; and
   training the neural network with a back propagation method modified by the loss metric.

4. The method of any of the preceding clauses, in which the neural network is for channel compression.

5. The method of any of the preceding clauses, further comprising receiving, from the base station, a configuration of the first threshold value via higher layer signaling, a downlink control information (DCI) message, or physical downlink shared channel (PDSCH) signaling.

6. The method of any of the preceding clauses, further comprising receiving the configuration to train the neural network via higher layer signaling, a downlink control information (DCI) message, or physical downlink shared channel (PDSCH) signaling, the receiving occurring in response to the current SNR exceeding the first threshold value.

7. The method of any of the preceding clauses, further comprising receiving an instruction to stop training the neural network, the instruction received via higher layer signaling, a downlink control information (DCI) message, or physical downlink shared channel (PDSCH) signaling, the receiving the instruction occurring in response to the current SNR falling below a second threshold value that is lower than the first threshold value.

8. The method of any of the preceding clauses, further comprising receiving an instruction to train the neural network based only on a current channel estimate and then use the neural network trained based on only the current channel estimate, the instruction received via higher layer signaling, a downlink control information (DCI) message, or physical downlink shared channel (PDSCH) signaling, the receiving the instruction occurring in response to the current SNR having a value between the first threshold value and a second threshold value.

9. The method of any of the preceding clauses, further comprising indicating, to the base station, that the current SNR exceeds the first threshold value.

10. The method of any of the preceding clauses, further comprising transmitting, to the base station, UE capability information for training the neural network for the plurality of different SNRs, the UE capability information indicating an amount of available UE memory and an amount of available UE processing power.

11. A method of wireless communication by a base station, comprising:
transmitting, to a user equipment (UE), a configuration to train a neural network for a plurality of different signal to noise ratios (SNRs) of a channel estimate for a wireless communication channel; and
receiving, from the UE, parameters of a first trained neural network along with the channel estimate, and parameters of a second trained neural network.

12. The method of clause 11, further comprising transmitting a first threshold value, above which the UE trains the neural network for the plurality of different SNRs.

13. The method of clause 11 or 12, in which the first threshold value is transmitted via higher layer signaling, a downlink control information (DCI) message, or physical downlink shared channel (PDSCH) signaling.

14. The method of any of the clauses 11-13, further comprising transmitting an instruction to stop training the neural network, the instruction transmitted via higher layer signaling, a downlink control information (DCI) message, or physical downlink shared channel (PDSCH) signaling, the instruction transmitting in response to a current SNR of the UE falling below a second threshold value that is lower than the first threshold value.

15. The method of any of the clauses 11-14, further comprising transmitting an instruction to train the neural network based only on a current channel estimate and then use the neural network trained based on only the current channel estimate, the instruction transmitted via higher layer signaling, a downlink control information (DCI) message, or physical downlink shared channel (PDSCH) signaling, the instruction transmitting in response to a current SNR having a value between the first threshold value and a second threshold value.

16. The method of any of the clauses 11-15, further comprising receiving, from the UE, UE capability information for training the neural network for the plurality of different SNRs, the UE capability information indicating an amount of available UE memory and an amount of available UE processing power.

17. The method of any of the clauses 11-16, in which the neural network is for channel compression.

18. An apparatus for wireless communication by a user equipment (UE), comprising:
a memory; and
at least one processor coupled to the memory, the at least one processor configured:
to receive, from a base station, a configuration to train a neural network for a plurality of different signal to noise ratios (SNRs) of a channel estimate for a wireless communication channel;
to determine a current signal to noise ratio (SNR) of the channel estimate is above a first threshold value;
to train the neural network based on the channel estimate, to obtain a first trained neural network;
to perturb the channel estimate to obtain a perturbed channel estimate;
to train the neural network based on the perturbed channel estimate, to obtain a second trained neural network; and
to report, to the base station, parameters of the first trained neural network along with the channel estimate, and parameters of the second trained neural network.

19. The apparatus of clause 18, in which the at least one processor is configured to train in response to the current SNR of the channel estimate exceeding the first threshold value.

20. The apparatus of clause 18 or 19, in which the at least one processor is further configured:
to compute a loss metric between a reconstructed channel estimate and the channel estimate having the current SNR above the first threshold value; and
to train the neural network with a back propagation method modified by the loss metric.

21. The apparatus of any of the clauses 18-20, in which the neural network is for channel compression.

22. The apparatus of any of the clauses 18-21, in which the at least one processor is further configured to receive, from the base station, a configuration of the first threshold value via higher layer signaling, a downlink control information (DCI) message, or physical downlink shared channel (PDSCH) signaling.

23. The apparatus of any of the clauses 18-22, in which the at least one processor is further configured to receive the configuration to train the neural network via higher layer signaling, a downlink control information (DCI) message, or physical downlink shared channel (PDSCH) signaling, the receiving occurring in response to the current SNR exceeding the first threshold value.

24. The apparatus of any of the clauses 18-23, in which the at least one processor is further configured to receive an instruction to stop training the neural network, the instruction received via higher layer signaling, a downlink control information (DCI) message, or physical downlink shared channel (PDSCH) signaling, the receiving the instruction occurring in response to the current SNR falling below a second threshold value that is lower than the first threshold value.

25. The apparatus of any of the clauses 18-24, in which the at least one processor is further configured to receive an instruction to train the neural network based only on a current channel estimate and then use the neural network trained based on only the current channel estimate, the instruction received via higher layer signaling, a downlink control information (DCI) message, or physical downlink shared channel (PDSCH) signaling, the receiving the instruction occurring in response to the current SNR having a value between the first threshold value and a second threshold value.

26. The apparatus of any of the clauses 18-25, in which the at least one processor is further configured to indicate, to the base station, that the current SNR exceeds the first threshold value.

27. The apparatus of any of the clauses 18-26, in which the at least one processor is further configured to transmit, to the base station, UE capability information for training the neural network for the plurality of different SNRs, the UE capability information indicating an amount of available UE memory and an amount of available UE processing power.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE), comprising:
    receiving, from a base station, a training configuration for a neural network for a plurality of different signal to noise ratios (SNRs) of a channel estimate for a wireless communication channel;
    determining a current signal to noise ratio (SNR) of the channel estimate is above a first threshold value;
    training the neural network based on the channel estimate, to obtain a first trained neural network;
    perturbing the channel estimate to obtain a perturbed channel estimate;
    training the neural network based on the perturbed channel estimate, to obtain a second trained neural network; and
    reporting, to the base station, parameters of the first trained neural network along with the channel estimate, and parameters of the second trained neural network.

2. The method of claim 1, in which the training occurs in response to the current SNR of the channel estimate exceeding the first threshold value.

3. The method of claim 1, further comprising:
    computing a loss metric between a reconstructed channel estimate and the channel estimate having the current SNR above the first threshold value; and
    training the neural network with a back propagation method modified by the loss metric.

4. The method of claim 1, in which the neural network is for channel compression.

5. The method of claim 1, further comprising receiving, from the base station, a configuration of the first threshold value via higher layer signaling, a downlink control information (DCI) message, or physical downlink shared channel (PDSCH) signaling.

6. The method of claim 1, further comprising receiving the training configuration for the neural network via higher layer signaling, a downlink control information (DCI) message, or physical downlink shared channel (PDSCH) signaling, the receiving occurring in response to the current SNR exceeding the first threshold value.

7. The method of claim 1, further comprising receiving an instruction to stop training the neural network, the instruction received via higher layer signaling, a downlink control information (DCI) message, or physical downlink shared channel (PDSCH) signaling, the receiving the instruction occurring in response to the current SNR falling below a second threshold value that is lower than the first threshold value.

8. The method of claim 1, further comprising receiving an instruction to train the neural network based only on a current channel estimate and then use the neural network trained based on only the current channel estimate, the instruction received via higher layer signaling, a downlink control information (DCI) message, or physical downlink shared channel (PDSCH) signaling, the receiving the instruction occurring in response to the current SNR having a value between the first threshold value and a second threshold value.

9. The method of claim 1, further comprising indicating, to the base station, that the current SNR exceeds the first threshold value.

10. The method of claim 1, further comprising transmitting, to the base station, UE capability information for training the neural network for the plurality of different SNRs, the UE capability information indicating an amount of available UE memory and an amount of available UE processing power.

11. A method of wireless communication by a base station, comprising:
   transmitting, to a user equipment (UE), a training configuration for a neural network for a plurality of different signal to noise ratios (SNRs) of a channel estimate for a wireless communication channel;
   receiving, from the UE, parameters of a first trained neural network along with the channel estimate, and parameters of a second trained neural network; and
   transmitting a first threshold value, above which the UE trains the neural network for the plurality of different SNRs.

12. The method of claim 11, in which the first threshold value is transmitted via higher layer signaling, a downlink control information (DCI) message, or physical downlink shared channel (PDSCH) signaling.

13. The method of claim 11, further comprising transmitting an instruction to stop training the neural network, the instruction transmitted via higher layer signaling, a downlink control information (DCI) message, or physical downlink shared channel (PDSCH) signaling, the instruction transmitting in response to a current SNR of the UE falling below a second threshold value that is lower than the first threshold value.

14. The method of claim 11, further comprising transmitting an instruction to train the neural network based only on a current channel estimate and then use the neural network trained based on only the current channel estimate, the instruction transmitted via higher layer signaling, a downlink control information (DCI) message, or physical downlink shared channel (PDSCH) signaling, the instruction transmitting in response to a current SNR having a value between the first threshold value and a second threshold value.

15. The method of claim 11, further comprising receiving, from the UE, UE capability information for training the neural network for the plurality of different SNRs, the UE capability information indicating an amount of available UE memory and an amount of available UE processing power.

16. The method of claim 11, in which the neural network is for channel compression.

17. An apparatus for wireless communication by a user equipment (UE), comprising:
   at least one memory; and
   at least one processor coupled to the at least one memory, the at least one processor configured:
      to receive, from a base station, a training configuration for a neural network for a plurality of different signal to noise ratios (SNRs) of a channel estimate for a wireless communication channel;
      to determine a current signal to noise ratio (SNR) of the channel estimate is above a first threshold value;
      to train the neural network based on the channel estimate, to obtain a first trained neural network;
      to perturb the channel estimate to obtain a perturbed channel estimate;
      to train the neural network based on the perturbed channel estimate, to obtain a second trained neural network; and
      to report, to the base station, parameters of the first trained neural network along with the channel estimate, and parameters of the second trained neural network.

18. The apparatus of claim 17, in which the at least one processor is configured to train in response to the current SNR of the channel estimate exceeding the first threshold value.

19. The apparatus of claim 17, in which the at least one processor is further configured:
   to compute a loss metric between a reconstructed channel estimate and the channel estimate having the current SNR above the first threshold value; and
   to train the neural network with a back propagation method modified by the loss metric.

20. The apparatus of claim 17, in which the neural network is for channel compression.

21. The apparatus of claim 17, in which the at least one processor is further configured to receive, from the base station, a configuration of the first threshold value via higher layer signaling, a downlink control information (DCI) message, or physical downlink shared channel (PDSCH) signaling.

22. The apparatus of claim 17, in which the at least one processor is further configured to receive the training configuration for the neural network via higher layer signaling, a downlink control information (DCI) message, or physical downlink shared channel (PDSCH) signaling, the receiving occurring in response to the current SNR exceeding the first threshold value.

23. The apparatus of claim 17, in which the at least one processor is further configured to receive an instruction to stop training the neural network, the instruction received via higher layer signaling, a downlink control information (DCI) message, or physical downlink shared channel (PDSCH) signaling, the receiving the instruction occurring in response to the current SNR falling below a second threshold value that is lower than the first threshold value.

24. The apparatus of claim 17, in which the at least one processor is further configured to receive an instruction to train the neural network based only on a current channel estimate and then use the neural network trained based on only the current channel estimate, the instruction received via higher layer signaling, a downlink control information (DCI) message, or physical downlink shared channel (PDSCH) signaling, the receiving the instruction occurring in response to the current SNR having a value between the first threshold value and a second threshold value.

25. The apparatus of claim 17, in which the at least one processor is further configured to indicate, to the base station, that the current SNR exceeds the first threshold value.

26. The apparatus of claim 17, in which the at least one processor is further configured to transmit, to the base station, UE capability information for training the neural network for the plurality of different SNRs, the UE capability information indicating an amount of available UE memory and an amount of available UE processing power.

* * * * *